Figure 1:
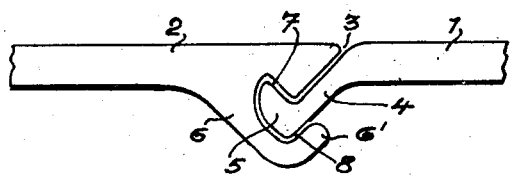

Nov. 22, 1932.  M. SACHS  1,888,936

JOINT FOR IRON PILINGS

Filed Oct. 5, 1929

Patented Nov. 22, 1932

1,888,936

UNITED STATES PATENT OFFICE

MAXIMILIAN SACHS, OF VIENNA, AUSTRIA, ASSIGNOR TO ARTHUR MAUTERER, OF DORTMUND, GERMANY

JOINT FOR IRON PILINGS

Application filed October 5, 1929, Serial No. 397,624, and in Germany April 26, 1929.

My invention relates to a joint for iron pilings which comprises a claw and a head engaging said claw.

According to the invention the head acts by means of two planes being angularly disposed to each other on two similarly disposed planes of the claw, said planes being angularly arranged in respect to the longitudinal direction of the piling, so that both claw planes oppose to the forces tending to detach the head from the claw and prevent, by preference in conjunction with the oblique contacting surfaces of the two piling members, said two members from rocking about the joint and from taking an angular position to each other.

The end of the claw forming one of the said abutment planes may engage a recess of the head.

In the drawing:

Fig. 1 shows by way of example a joint of piling with a beak or hook like head directly projecting from the oblique end portion of one piling member.

Figure 2:
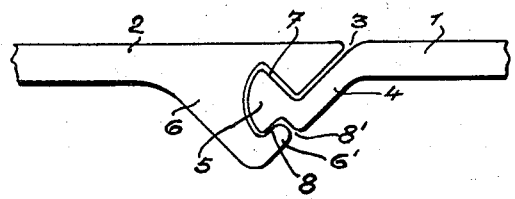

Fig. 2 shows a modified form of the joint the head of which starts laterally from the oblique end of one piling member, one end of the claw engaging a recess of said head.

The two piling members 1 and 2 contact each other along oblique joint planes 3 and one of the contacting planes is formed by the obliquely bent end portion or arm 4 of the one piling member. Such oblique end portion terminates in a beak or hook 5 projecting laterally from the end portion 4 and forming the head of the joint. This head 5 engages the corresponding opening of the claw 6.

The head 5 has two planes 7 and 8 which are angularly disposed to each other and are in contact with two correspondingly arranged planes of the claw opening, and each of such planes is also angularly disposed in respect to the longitudinal direction (1—2) of the piling.

Thereby the double purpose is obtained that with forces acting in the longitudinal direction of the piling both planes of the claw coact in preventing the head from being detached from the claw and that the two members are firmly held in relative position, so that they are prevented from taking an angular position to each other. Such effect is increased, if the two piling members 1 and 2 contact each other along an oblique plane as shown in the drawing.

The end 6' of the one branch of the claw 6 simply overgrips the oblique end 4 of the piling member 1 forming the head as shown.

In the modified form of the invention shown in Figure 2, the bent end 6ᶜ of the claw 6ᵇ engages in a recess 8' which is formed in the angle between the arm 4ᵃ and the head 5ᵃ, the said bent end c' bearing against one side of said recess as at 8ᵃ.

In both forms of the invention it will be noted that in the event of stress tending to pull the members apart, the head bears against the opposing surface of the oblique recess in the one member and the claw of said member on the outer side of said head also at its bent end bears against the outer side of said head, so that the pulling apart of the members is entirely prevented and moreover the stresses are distributed to opposite sides of the head instead of being confined to one side thereof.

What I claim is:

1. A joint for sheet iron pilings comprising two members exposing surfaces in a level plane thruout one side thereof, one member having an angularly disposed end which contacts the end of the other member so as to form an oblique joint, a head at the end of the first-named member extending towards said level plane, a socket in the other member to receive said head, said head and socket each having two cooperating surfaces located in planes at an angle relatively to each other.

2. A joint for sheet iron pilings comprising two members exposing surfaces in a level plane throughout one side thereof, one member having an angularly disposed end which contacts the end of the other member, so as to form an oblique joint, a head at the end of the first-named member extending towards said level plane, a socket in the other member to receive said head, said head and socket each having two cooperating surfaces located in planes at an angle relatively to each other, and said planes intersecting said lever planes.

3. A joint for sheet iron pilings comprising two members exposing surfaces in a level plane throughout one side thereof, one member having an angularly disposed end which contacts the end of the other member, so as to form an oblique joint, a head at the end of the first-named member extending towards said level plane, a socket in the other member to receive said head, said head and socket each having two cooperating surfaces located in planes at an angle relatively to each other, said planes being at right angles to each other and intersecting said level planes.

4. A joint for sheet iron pilings comprising two members exposing surfaces in a level plane throughout one side thereof, one member having an angularly disposed end which contacts the end of the other member, so as to form an oblique joint, a head at the end of the first-named member extending towards said level plane, a socket in the other member to receive said head, said head and socket each having two cooperating surfaces located in planes at an angle relatively to each other, said head having a recess in its base to receive one end of the socket.

In witness whereof I affix my signature.

MAXIMILIAN SACHS.